March 10, 1970 — N. L. GONGWER — 3,499,380

AUTOMATIC FOOD COOKING MACHINE

Filed Oct. 6, 1967 — 2 Sheets-Sheet 1

INVENTOR
NELSON L. GONGWER
BY John J. Gaydos
ATTORNEY

March 10, 1970 — N. L. GONGWER — 3,499,380
AUTOMATIC FOOD COOKING MACHINE
Filed Oct. 6, 1967 — 2 Sheets-Sheet 2
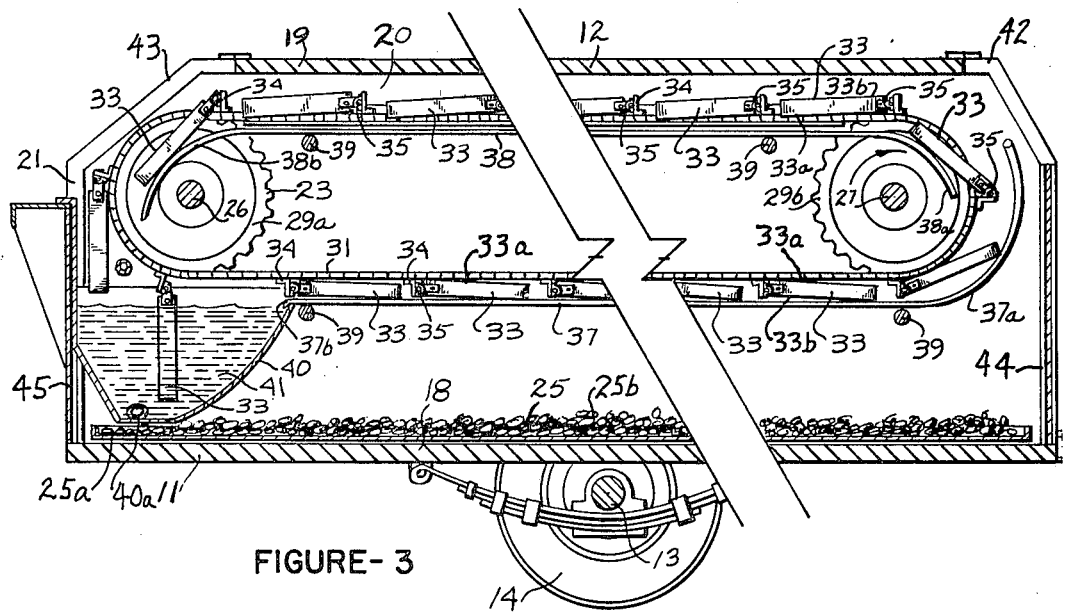
FIGURE-3
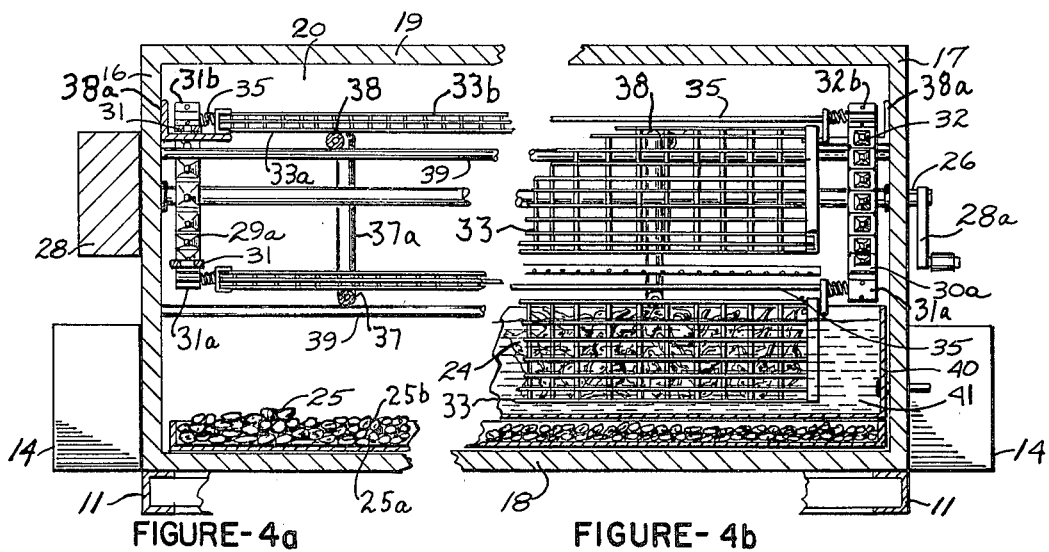
FIGURE-4a  FIGURE-4b
FIGURE-5  FIGURE-6
INVENTOR
NELSON L. GONGWER
BY John J. Gaydos
ATTORNEY United States Patent Office 3,499,380
Patented Mar. 10, 1970

3,499,380
AUTOMATIC FOOD COOKING MACHINE
Nelson L. Gongwer, Wakarusa, Ind.
(2020 Ida Road, Elkhart, Ind. 46514)
Filed Oct. 6, 1967, Ser. No. 673,335
Int. Cl. A47j 37/04, 37/10
U.S. Cl. 99—346                          10 Claims

ABSTRACT OF THE DISCLOSURE

An automatic food cooking machine comprising a frame supporting a housing having an unobstructed opening with a burner at the bottom thereof. Mounted in the opening of the housing are a pair of spaced parallel endless conveyor chains supported on sprockets connected to a pair of spaced shafts driven by a motor. A plurality of spaced rods are connected normal to the conveyor chains and a basket for holding food is pivotally supported by each of the rods. Preferably a sauce tank disposed above the burner is supported at one end of the housing at the end of travel of the conveyor chains. Guide rails longitudinally mounted in the housing between the spaced shafts and the conveyor chains support the basket parallel to the burner. When each of the baskets reaches the end of one of the rails, each of the baskets pivots from a horizontal position to a vertical position and into the sauce tank dipping the basket and the food into the sauce.

---

Figure 1:
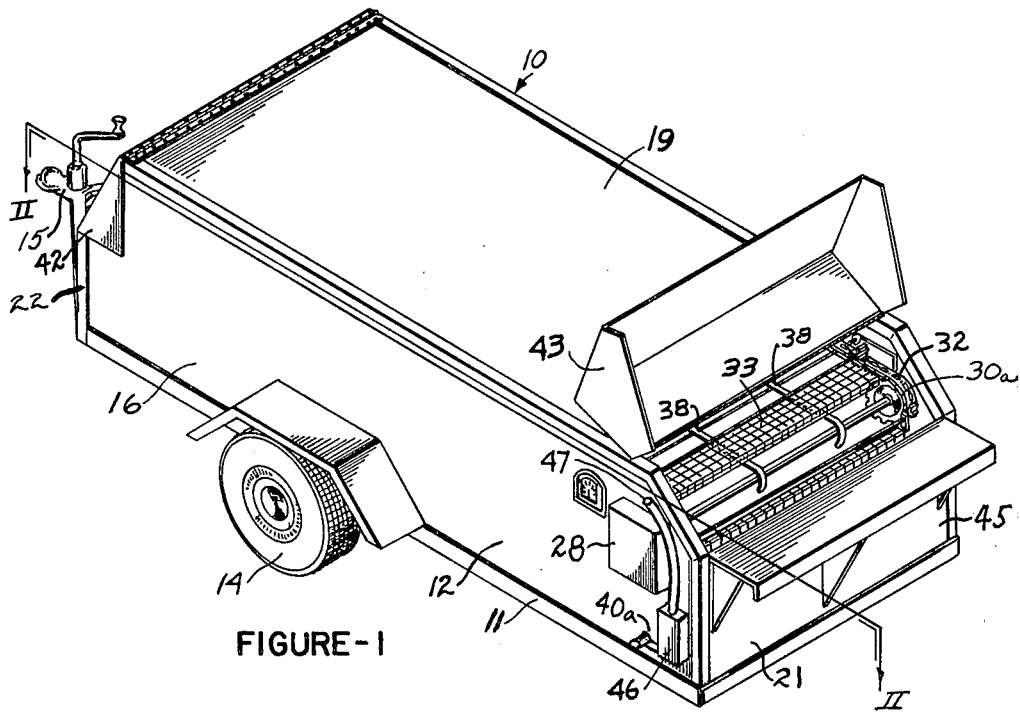

The present invention relates to a cooking machine and, more particularly, to an automatic cooking machine for broiling food products.

The demand for portable cooking machines has been increasing since organizations prefer to provide hot cooked food at a specific location. Initially the food products were cooked in a kitchen and then carried to the location. Difficulties are encountered in keeping the food products hot after they have been cooked in the kitchen. Portable cooking machines such as shown in Stall Patent No. 3,025,782 have been employed by organizations for cooking food products at a specific location. Although such machines have been satisfactory, manual means are used for rotating the food products to the burner. It would, therefore, be desirable to provide a cooking machine where one side and then the other side of the food products are automatically exposed to the burner.

While certain food products are being cooked, it would be desirable to apply a sauce to the food products to improve the flavor thereof. The present invention is therefore, provided with a sauce tank containing sauce heated by the burner and, as the food products are transported over the burner, the food products are periodically coated with the sauce.

Accordingly, it is an object of the present invention to provide a cooking machine with a conveyor for transporting food products to be cooked over a burner located in the machine. Another object of the present invention is to provide a cooking machine with means for periodically dipping food products into a sauce as the food products are being cooked. An additional object of the present invention is to provide a cooking machine with an endless conveyor and guide rails for guiding baskets containing food products to be cooked parallel to a burner disposed in the machine and for rotating the baskets to expose both sides of the food products to the burner. Further objects and advantages of the present invention will become apparent as the following description proceeds, and as the features of novelty which characterize the invention will be pointed out with particularity in the claims annexed to and forming a part of this specification.

Briefly, the present invention is directed to an automatic food cooking machine cmprising a frame supporting a housing having an unobstructed opening with a burner at the bottom thereof. Mounted in the opening of the housing are a pair of spaced parallel endless conveyor chains supported on sprockets connected to a pair of spaced shafts driven by a motor or by hand. A plurality of spaced rods are connected normal to the conveyor chains and a basket for holding food products is pivotally supported by each of the rods. Preferably a sauce tank disposed above the burner is supported at one end of the housing at the end of travel of the conveyor chains. Guide rails longitudinally mounted in the housing between the spaced shafts and the conveyor chains support the baskets parallel to the burner as the baskets are transported from one end of the housing to the other end of the housing and then returned to complete a cooking cycle. When each of the baskets reaches the end of the rails, each basket pivots from a horizontal position to a vertical position and into the sauce tank dipping the basket and the food products into the sauce. Each of the baskets is then lifted by the conveyor chains from the sauce tank and transported over the burner to the other end of the housing. During one-half of the cycle as the baskets are transported away from the one end of the housing, one side of the food products in the baskets faces the burner and, during the other half of the cycle, the other side of the food products in the baskets faces the burner assuring that the food products are properly cooked on both sides and periodically dipped into the sauce.

Figure 2:
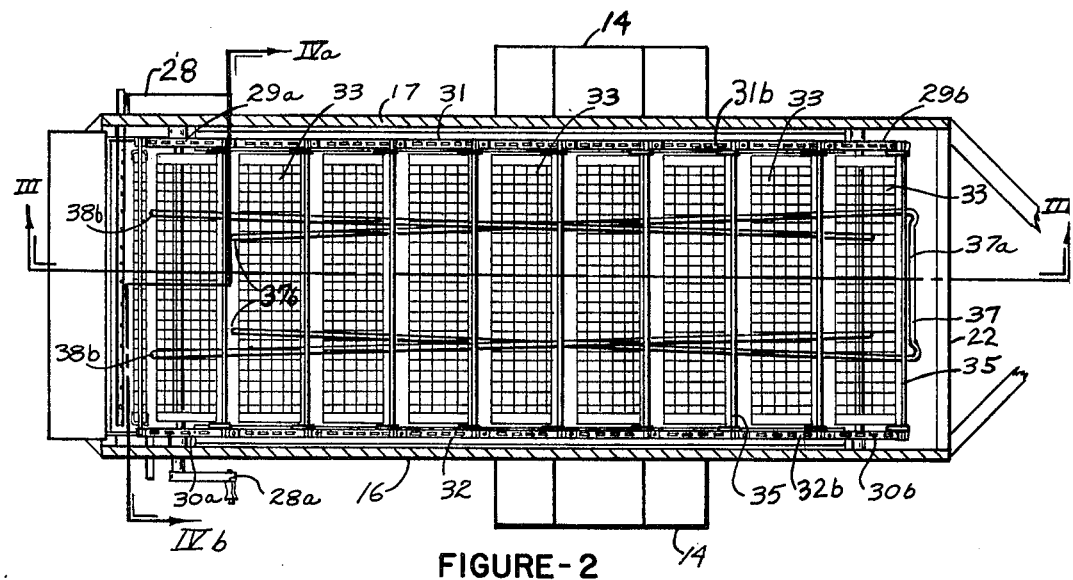

For a better understanding of the present invention, reference may be had to the accompanying drawings wherein the same reference numerals have been applied to like parts and wherein: FIGURE 1 is an isometric view of an automatic cooking machine built in accord with the present invention; FIGURE 2 is a sectional view taken along line II—II of FIGURE 1; FIGURE 3 is a sectional view taken along line III—III of FIGURE 2, assuming that FIGURE 2 is shown in full; FIGURE 4a is a fragmentary sectional view taken along the top half of line IVa–IVb of FIGURE 2, assuming that FIGURE 2 is shown in full; FIGURE 4b is a fragmentary sectional view taken along the bottom half of line IVa—IVb of FIGURE 2, assuming that FIGURE 2 is shown in full; FIGURE 5 is an end view of a basket for carrying food products to be cooked; and FIGURE 6 is a front view of a portion of the basket shown in FIGURE 5.

Referring now to the drawings, there is illustrated a portable automatic food cooking machine, generally designated at 10, comprising a frame 11 supporting a housing 12. The frame 11 is supported on an axle 13 having a pair of wheels 14 for movement of the machine from one location to another. A trailer hitch 15 provided at one end of the frame 11 facilitates securing of the machine 10 to a not shown truck or automobile.

The housing 12 is defined by a pair of spaced vertically disposed side walls 16, 17, a bottom wall 18 secured to the frame 11 and a top wall 19 connected to the side walls providing a substantially unobstructed opening 20 from one end or the front 21 to the other end or the rear 22 of the housing 12. The housing 12 and all of the parts thereof are of metal. The material of certain parts of the housing such as the side and bottom walls thereof can be of asbestos or other material capable of withstanding the cooking temperatures. Mounted in the opening 20 is a conveyor means 23 for transporting food products 24 (see FIGURE 4b) to be cooked over a heating means or a burner 25. As best shown in FIGURE 3, the conveyor means 23 comprises a pair of spaced parallel shafts 26, 27 rotatably mounted in bearings secured to the side walls 16, 17, one of the shafts 26 being disposed in the front of the housing and the other of the shafts 27 being disposed in the rear of the housing. One of the shafts 26 is drivingly connected to a power means such as a variable speed gear motor 28 for rotating the shaft 26 at a selected predetermined speed. A hand crank 28a also secured to the shaft 26 can be employed for manually rotating the shaft 26 or for rotating the shaft 26 faster than the gear motor 28. A pair of sprockets 29a, 30a are secured to opposite ends of the shaft 26, and a pair of sprockets 29b, 30b are secured to opposite ends of the shaft 27. An endless conveyor chain 31 interconnects the sprockets 29a, 29b, and an endless conveyor chain 32 in spaced parallel relationship to the conveyor chain 31 interconnects the sprockets 30a, 30b. Since the conveyor chains 31, 32 are driven by the shaft 26 and the sprockets 29a, 30a secured thereto, the shaft 27 and the sprockets 29b, 30b are solely for supporting and maintaining proper tension on the chains 31, 32. Suitable means are provided for shifting the shaft 27 toward or away from the shaft 26 to control the tension of the conveyor chains.

Carrying means 33, such as baskets of wire mesh, are pivotally mounted on the conveyor chain and normal to the chains for holding the food products. More specifically, a plurality of driving lugs 34 are secured to the chains 31, 32 at spaced intervals and arranged in pairs, one lug of each pair being secured to one of the chains. A plurality of rods 35, each of the rods carrying one of the baskets and detachably connected to each pair of lugs, transports the baskets over the burner 25. As best shown in FIGURE 5, the end portions of each of the baskets 33 are provided with apertures or other suitable means 36 for receiving one of the rods 35 thereby permitting each of the baskets to pivot or rotate about the axis of one of the rods 35. Obviously the baskets 33 can be rigidly secured to the rods 35 and the rods 35 can be rotatably and detachably supported in bearings fastened to the lugs. Any suitable mounting means for the baskets 33 is satisfactory so long as each of the baskets can rotate 360 degrees during a single cooking cycle, i.e., the transporting of a basket 33 in the housing through one revolution. Each basket 33 comprises a pair of L-sections 33a, 33b pivotally secured together as shown in FIGURE 5, the distance between the sections depending upon the type of food products to be cooked, i.e., the baskets should keep the food products firmly in place to prevent movement thereof as the baskets are transported by the conveyor means 23. Suitable latching means keeps the two sections of the basket together. The number of baskets 33 mounted on the chains depends upon the length of the conveyor chains in the opening of the housing.

As each of the baskets 33 is transported by the conveyor means 23 in the unobstructed opening 20 from the front to the rear and then from the rear to the front of the housing to complete the cooking cycle, it is preferable that guide means 37, 38 be employed for maintaining the baskets 33 in a horizontal position, i.e., parallel to the burner 25 disposed at or near the bottom of the housing 12 below the baskets. As best shown in FIGURES 2 and 3 of the drawings, the guide means 37, 38 comprise two pairs of elongated rails for supporting the baskets. The ends of the lower pair of rails 37 are joined together and curved upwardly as at 37a to receive each of the baskets as each basket is being rotated 180 degrees by the downwardly curved ends 38a of the upwardly disposed rails 38. Cross bars 39 secured to the side walls 16, 17 support the guide rails 37, 38 in the housing 12. The lower pair of rails 37 lie just below the plane of the lower sections 31a, 32a of the conveyor chains 31, 32, and the upper pair of rails 38 lie just below the plane of the upper sections 31b, 32b of the conveyor chains assuring that the baskets are transported by the conveyor means horizontally over the burner 25. Side rails 38a (see FIGURES 4a, 4b) are secured to the side walls 16, 17 for supporting the upper sections 31a, 32a of the conveyor chains since these sections are not in tension when the sprockets are rotating in a clockwise direction as shown by sprocket 29b in FIGURE 3.

Rotation of the baskets 33 through a single cooking cycle can best be understood by following one of the baskets around the sprocket 29b as the shaft 27 rotates in the direction shown by the arrow in FIGURE 3. Basket 33 above the sprocket 29b has side 33a exposed to and facing the burner 25. As the basket 33 is driven by the upper sections 31b, 32b of the conveyor chains 31, 32 around the sprockets 29b, 30b, the basket 33 pivots or rotates with respect to the rod 35 in a clockwise direction since the chains are transporting the rod 35 downwardly while the curved ends 38a of the rails 38 support the basket. The basket continues to rotate slowly in such direction until the basket is disposed vertically above the rod in an unstable or labile position. Further movement of the rod 35 by the chains causes the basket 33 to swing or rotate outwardly until the basket is caught by the upwardly curved ends 37a of the rails 37. The basket 33, in switching from the upper guide rails 38 to the lower guide rails 37, is rotated 180 degrees to expose the other side 33b of the basket 33 to the burner 25 and remains in such horizontal position until the basket reaches the one end or front 21 of the housing 12. Since the side 33b of each of the baskets 33 is closer to the burner than the side 33a, the side of the food products corresponding to the side 33b receives slightly more heat than the other side of the food products. This variation in cooking of the sides of the food products is minimized by keeping the diameter of the sprockets as small as possible. Sprocket diameters of six, eight and ten inches have proven to be satisfactory for cooking food products such as chicken, steak, chops and corn. Experimental tests have indicated that such variation in heat to the sides of the food products is desirable when chicken halves are being cooked in the machine 10 since the inner or bone side of the chicken half should receive more heat than the outer or skin side.

In order to improve the flavor of the food products 24 being cooked, a sauce tank 40 (see FIGURE 3) filled with sauce 41 is disposed in the front 21 of the housing below the sprockets 29a, 30a. As each of the baskets 33 approaches and moves beyond the other ends 37b of the lower rails 37, the baskets swing into the sauce 41 as shown in FIGURE 3 until each basket is vertically disposed in the sauce. Adequate sauce 41 is provided in the tank 40 to immerse completely the food products 24 contained in the baskets 33. Preferably the sauce tank 40 is mounted above the end of the burner 25 for maintaining the sauce hot. As the conveyor chains continue to transport each of the baskets 33 through the sauce, the chains lift each of the baskets in sequence out of the sauce. After the basket 33 has been completely removed from the sauce 41, the basket 33 remains in a vertical position permitting the excess sauce to drip from the basket and the food products back into the sauce tank. The sauce can be removed from the sauce tank through a drain 40a, or a pump 46 and sprayer 47 can be employed for spraying the food products with sauce while in or above the sauce tank 40. When the rod 35 supporting the basket reaches the top outer quarter portion of the sprocket 29a, the basket engages downwardly curved ends 38b of the upper guide bars 38. Slowly the basket is rotated clockwise from the vertical to the horizontal position completing another 180 degrees of rotation of the basket. The cooking cycle is repeated until the food products are completely cooked. At that time when the basket is in a vertical position above the sauce, it is detached from the conveyor chains 31, 32 and another basket containing uncooked food products is attached to the chains.

Covers 42, 43 provided in the rear 22 and the front 21 of the housing close openings for removal and inspection of the food products in the baskets. The front and rear walls 45, 45 are removable to facilitate removal of the burner 25 from either end of the housing. The burner 25 can be at any suitable heating means and in the present invention is shown as a pan 25a adjustably spaced from the bottom of the housing and containing coals 25b.

In view of the above, it is apparent that the cooking machine 10 of the present invention can be used in locations where no electricity is available. If the machine is kept semi-permanently in a specific location, gas can be employed for heating the coals 25b which would be of a ceramic material otherwise charcoal is employed. Electric elements can also be used.

It is to be understood that the term "cooking" denotes all forms of cooking food such as by broiling, barbecuing, baking and the like where a heating means such as a burner is employed.

The invention claimed is:

1. An automatic cooking machine comprising a horizontal frame, a housing supported on the frame, said housing having a pair of spaced side walls and a top wall to define a substantially unobstructed horizontal opening between the front and rear of the housing, a heating means disposed in the bottom of the housing, carrying means disposed in the opening above the heating means for holding food products to be cooked by the heating means, a sauce tank mounted in the housing, conveyor means disposed in the housing for transporting the carrying means in the opening in spaced relationship to the heating means from the front to the rear of the housing and into the sauce tank, only one side of the food products being exposed to the heating means while the conveyor means is moving the carrying means from the front to the rear of the housing, means for rotating the carrying means 180 degrees to expose the other side of the food products to the heating means as the carrying means is moving from the rear to the front of the housing, and power means for driving the conveyor means.

2. The machine of claim 1, wherein the conveyor means comprises an endless chain, the carrying means is carried by the endless chain, and the sauce tank is disposed adjacent to one end of travel of the chain whereby the carrying means is alternately transported past the heating means for cooking the food products carried by the carrying means and dipped into the sauce tank for flavoring the food products.

3. The machine of claim 1, wherein the conveyor means comprises a pair of endless chains in spaced parallel relationship, the carrying means is connected to and between the chains and normal thereto for transporting the food products to be cooked over the heating means.

4. The machine of claim 3, wherein the carrying means comprises a rod having its end portions connected to the endless chains, an elongated basket pivotally supported on the rod along one of its elongated sides, and guide means is mounted in the housing for supporting the basket parallel to the heating means as the basket is transported from the front to the rear of the housing whereby as the basket reaches one end of the housing the basket leaves the guide means and pivots on the rod into the sauce tank for flavoring the food products.

5. The machine of claim 4, wherein the endless chains comprise upper and lower chain sections and the guide means comprises two guide rails, one of the rails lying in a plane passing through the upper chain sections and the other rail lying in a plane passing through the lower chain sections.

6. The machine of claim 5, wherein a downwardly curved end portion is connected to one end of the one rail for guiding rotation of the basket 180 degrees as the basket is transported by the endless chains from the upper section to the lower chain section for exposing both sides of the food products in the basket to the heating means.

7. In an automatic cooking machine, the combination of a housing provided with a substantially unobstructed horizontal opening, heating means disposed in the bottom of the housing, conveyor means mounted in the housing, carrying means connected to the conveyor for carrying food products to be cooked over the heating means, only one side of the food products being exposed to the heating means while the conveyor means is moving the carrying means from the front to the rear of the housing, means for rotating the carrying means 180 degrees to expose the other side of the food products to the heating means as the carrying means is moving from the rear to the front of the housing, means mounted in the housing for applying sauce onto the food products whereby the carrying means holding the food products to be cooked is alternately transported over the heating means and to the means for applying the sauce onto the food products until the food products are cooked.

8. The machine of claim 1, wherein the heating means is mounted in the housing below the conveyor means and a portion of the heating means extends below the sauce tank for heating the contents therein.

9. The machine of claim 8, wherein the heating means comprises a pan for supporting coals, the pan being removable from the front or rear of the housing.

10. The machine of claim 1, wherein the conveyor means comprises a pair of shafts journaled in the housing, a pair of spaced sprockets secured to each of the shafts, and a pair of endless chains in spaced parallel relationship connected to the sprockets, the power means being drivingly connected to one of the pair of sprockets for rotating the sprockets and driving the chain for transporting the carrying means in the opening.

References Cited

UNITED STATES PATENTS

| | | | |
|---|---|---|---|
| 1,517,795 | 12/1924 | Morrisson et al. | 99—402 XR |
| 1,600,776 | 9/1926 | Peron | 99—345 |
| 1,638,452 | 8/1927 | Panajiotaros et al. | 99—345 |
| 1,786,300 | 12/1930 | Harrison | 99—345 XR |
| 2,533,080 | 12/1950 | Alexander | 99—443 |
| 2,655,096 | 10/1953 | Ebin | 99—443 XR |
| 2,689,517 | 9/1954 | Angelus | 99—345 |
| 2,788,735 | 4/1957 | Farace | 99—355 XR |
| 3,025,782 | 3/1962 | Stall | 99—339 |
| 3,338,156 | 8/1967 | Angelos | 99—427 |

BILLY J. WILHITE, Primary Examiner

U.S. Cl. X.R.
99—386, 402, 443, 427